US010397674B2

(12) United States Patent
Detwiler et al.

(10) Patent No.: US 10,397,674 B2
(45) Date of Patent: Aug. 27, 2019

(54) PON WAVELENGTH BONDING FOR PROVIDING HIGHER-RATE DATA SERVICES

(71) Applicant: ADTRAN, INC., Huntsville, AL (US)

(72) Inventors: Thomas Detwiler, Huntsville, AL (US); Richard Lee Goodson, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 194 days.

(21) Appl. No.: 15/492,590

(22) Filed: Apr. 20, 2017

(65) Prior Publication Data
US 2017/0223438 A1  Aug. 3, 2017

Related U.S. Application Data

(63) Continuation-in-part of application No. 15/341,677, filed on Nov. 2, 2016, now Pat. No. 9,924,248.
(Continued)

(51) Int. Cl.
*H04J 14/00* (2006.01)
*H04Q 11/00* (2006.01)
(Continued)

(52) U.S. Cl.
CPC ......... *H04Q 11/0067* (2013.01); *H04B 10/27* (2013.01); *H04J 14/0256* (2013.01);
(Continued)

(58) Field of Classification Search
CPC .... H04B 10/27; H04B 10/50; H04Q 11/0067; H04Q 11/0066; H04J 14/02; H04J 14/023;
(Continued)

(56) References Cited

U.S. PATENT DOCUMENTS

2017/0012731 A1\* 1/2017 Luo .................. H04J 3/1694
2017/0070295 A1\* 3/2017 Remein ............. H04B 10/50

FOREIGN PATENT DOCUMENTS

EP  2838217 A1  2/2015

OTHER PUBLICATIONS

International Search Report and Written Opinion issued in International Application No. PCT/US2017/028623, dated Aug. 3, 2017, 15 pages.

(Continued)

*Primary Examiner* — Hanh Phan
(74) *Attorney, Agent, or Firm* — Fish & Richardson P.C.

(57) ABSTRACT

Methods, systems, and apparatus for Passive Optical Network (PON) wavelength bonding are disclosed. In one aspect, a first frame of data to a first optical network unit (ONU) is transmitted by an optical line terminal (OLT) over a first wavelength. While the first frame of data is being transmitted to the first ONU over the first wavelength, a first portion of a second frame of data to a second ONU is transmitted by the OLT over a second wavelength. After transmission of the first frame of data over the first wavelength has completed and while the first portion of the second frame of data is still being transmitted to the second ONU over the second wavelength, a second portion of the second frame of data to the second ONU is transmitted by the OLT over the first wavelength.

20 Claims, 10 Drawing Sheets

Related U.S. Application Data

(60) Provisional application No. 62/261,683, filed on Dec. 1, 2015, provisional application No. 62/325,103, filed on Apr. 20, 2016.

(51) Int. Cl.
*H04B 10/27* (2013.01)
*H04J 14/02* (2006.01)

(52) U.S. Cl.
CPC .......... *H04J 14/0282* (2013.01); *H04Q 11/00* (2013.01); *H04Q 2011/0064* (2013.01); *H04Q 2011/0088* (2013.01)

(58) Field of Classification Search
CPC ............... H04J 14/0234; H04J 14/0236; H04J 14/0239; H04J 14/0245; H04L 47/29; H04L 12/4633; H04L 69/22
USPC ........ 398/66, 67, 68, 69, 70, 71, 72, 79, 98, 398/99, 100, 45, 48, 49, 50, 58, 59, 51; 370/352, 392, 389, 468, 431, 329, 465
See application file for complete search history.

(56) References Cited

OTHER PUBLICATIONS

Goodson, Richard et al., "NGPON2 Channel bonding OMCI Proposal", ITU-T Draft; Study Period 2013-2016, International Telecommunication Union, Geneva; Switzerland, vol. 2/15, Nov. 12, 2016, p. 1-6, paper XP044186618; https://www.itu.int/ifa/t/2013/sg15/exchange/wp1/q2/16-11-16_Hangzhou/OriginalUplods/ADTRAN_Bonding-Draft_OMCI.pdf .

Goodson, Richard et al., "NGPON2 Channel bonding OMCI Proposal", ITU-T Draft; Study Period 2013-2016, International Telecommunication Union, Geneva; Switzerland, vol. 2/15, Nov. 12, 2016, p. 1-8, paper XP044186560; https://www.itu.int/ifa/t/2013/sg15/exchange/wp1/q2/16-11-16_Hangzhou/ADTRAN_Bonding-Draft_Text.docx.

Sivakumar, Anusha et al., "Performance analysis of ONU-wavelength grouping schemes for efficient scheduling in long reach-PONs", Optical Switching and Networking, vol. 10, No. 4, Nov. 1, 2013, pp. 465-474, XP055368251 NL.

Ohta, Masataka et al., Standardization of optical packet switching with many-wavelength packets:, Innovations in NGN, Future Network and Services, 2008. K-INGN 2008. First ITU-T Kaleidoscope Academic Conference, IEEE, Piscataway, NJ, USA, May 12, 2008, pp. 359-366, XP031272319.

* cited by examiner

PON WAVELENGTH BONDING FOR PROVIDING HIGHER-RATE DATA SERVICES

CROSS-REFERENCE TO RELATED APPLICATIONS

This application is a continuation-in-part of U.S. patent application Ser. No. 15/341,677 filed on Nov. 2, 2016, entitled "PON Wavelength Bonding for High-Rate Services," which claims priority to U.S. Provisional Application No. 62/261,683, filed Dec. 1, 2015, entitled "NG-PON2 Wavelength Bonding for High-rate Services," the entire disclosures of which are incorporated by reference herein.

This application claims priority to U.S. Provisional Application No. 62/325,103, filed Apr. 20, 2016, entitled "NGPON2 Channel Bonding for >10 Gbps Peak Service Rate," the entire disclosure of which is incorporated by reference herein.

BACKGROUND

This specification relates to Passive Optical Network (PON) wavelength bonding.

In a PON, data rates are increasing to 10 Gbps per wavelength, and 25 Gbps per wavelength in the near future. However, demand for peak data rates may exceed the per-wavelength rate of installed equipment, such that multiple wavelengths may be used to increase capacity between an Optical Line Terminal (OLT) and an Optical Network Unit (ONU). For example, Next Generation Passive Optical Network (NG-PON2) with FEC enabled specifies an 8.67 Gbps peak rate per downstream/upstream wavelength, and using two wavelengths would increase the peak rate to 17.34 Gbps per downstream/upstream.

SUMMARY

In general, one innovative aspect of the subject matter described in this specification can be embodied in methods for configuring an Optical Line Terminal (OLT) and an Optical Network Unit (ONU, also referred to as Optical Network Terminal or ONT) on a Passive Optical Network (PON) to support wavelength bonding for improving bandwidth available to an individual packet flow. The OLT and ONU can be configured using an OLT controller that provides an ONT management control interface (OMCI) for configuring various management functions for enabling PON wavelength bonding. The described bonding techniques can be suitable for standardization to enable interoperability between equipment provided by different service providers.

An example of an OLT controller includes a first communications interface over which the OLT controller interacts with an OLT, a second communications interface that enables the OLT controller to interact with multiple optical network units (ONUs), and one or more processors that configure a control plane of the OLT and the multiple ONUs. The one or more processors can perform operations that include: assigning, in two or more physical ports of the OLT, a bonded XGEM (bXGEM) to a first optical network unit (ONU) from among multiple ONUs that are connected to the OLT, assigning, to each of multiple access node interfaces (ANIs) in the first ONU, a bonded Transmission Container (bT-CONT), associating, using a bonded group list (BGL), the bXGEM that is assigned to the first ONU with multiple different bT-CONTs of the first ONU. The BGL association of the bXGEM with the multiple different bT-CONTs configures the first ONU to transmit data packets to the OLT over the bXGEM using multiple different wavelengths corresponding to the multiple different bT-CONTs.

These and other implementations can each, optionally, include one or more of the following features. For example, in some implementations, the multiple different bT-CONTs include a first bT-CONT that carries traffic from the first ONU over a first wavelength and a second bT-CONT that carries traffic from the first ONU over a second wavelength. In such implementations, the operations performed by the one or more processors additionally include associating, using a priority queue associated with the bXGEM, the first bT-CONT and the second bT-CONT containing traffic for the bXGEM.

In some implementations, the operations performed by the one or more processors additionally include associating, using a scheduler associated with the bXGEM, the first bT-CONT and the second bT-CONT containing traffic for the bXGEM.

In some implementations, the operations performed by the one or more processors additionally include: assigning, in one of the two or more physical ports of the OLT, an unbonded XGEM port (XGEM) for transmitting packet data to a second ONU from the among the multiple ONUs that are connected to the OLT, associating the XGEM with an unbonded Transmission Container (T-CONT) of the second ONU. In such implementations, the association of the XGEM with the T-CONT configures the second ONU to transmit additional data packets to the OLT over the XGEM using the single wavelength.

In some implementations, the operations performed by the one or more processors additionally include: assigning, in one of the two or more physical ports of the OLT, an unbonded XGEM port (XGEM) for transmitting packet data to the first ONU from the among the multiple ONUs that are connected to the OLT, associating the XGEM with an unbonded Transmission Container (T-CONT) of the first ONU. In such implementations, the association of the XGEM with the T-CONT configures the first ONU to transmit additional data packets to the OLT over the XGEM using the single wavelength.

In some implementations, the operations performed by the one or more processors additionally include: determining an offered load representing a combined traffic volume on the upstream priority queue associated with the first bT-CONT and the second bT-CONT, and dynamically balancing a traffic load over the first and second bT-CONTs based on the determined combined load and other traffic on the PON.

In some implementations, the OLT controller runs on the OLT. Alternatively, in other implementations, the OLT controller runs on a server system that is distinct from the OLT.

The methods, devices, and/or systems described in the present disclosure can synchronize and time equalize bit streams of a packet flow, for example, between an OLT and an ONU, on multiple wavelengths. Different portions (e.g., fixed size segments) of a given packet in the packet flow are distributed on the multiple wavelengths at one end of a communications path (e.g., at the OLT) on-demand at real-time basis, and combined at the other end of the communications path (e.g., the ONU). In doing so, latency for transmitting the packet is reduced, since the packet is transmitted on multiple wavelengths simultaneously and each wavelength only carries a portion of the packet instead of the whole packet. In addition, demand for peak data rate of a packet flow exceeding a data rate of a single wavelength can be supported. For example, with two wavelengths (e.g., each wavelength having an 8.67 Gbps peak data rate) carrying a packet comprising multiple words (e.g., 64-bit words) between an OLT and an ONU, the odd words of the packet can be sent on one wavelength and the even words of the packet can be sent on the other wavelength. As a result, the effective peak data rate between the OLT and the ONU is doubled (e.g., 17.34 Gbps). Additional wavelengths may be added, extending to 3, 4, or any number of active enabled wavelengths. Furthermore, the disclosed method enables an OLT to dynamically balance loads according to offered non-bonded load (e.g., traffic carried by a single wavelength) and bonded load (e.g., traffic carried by multiple wavelengths in a bonding group), since bonded loads are distributed on available wavelengths in a bonding group on-demand, at real-time basis.

While some aspects of this disclosure refer to computer-implemented software embodied on tangible media that processes and transforms data, some or all of the aspects may be computer-implemented methods or further included in respective systems or devices for performing the described functionality. The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1A:
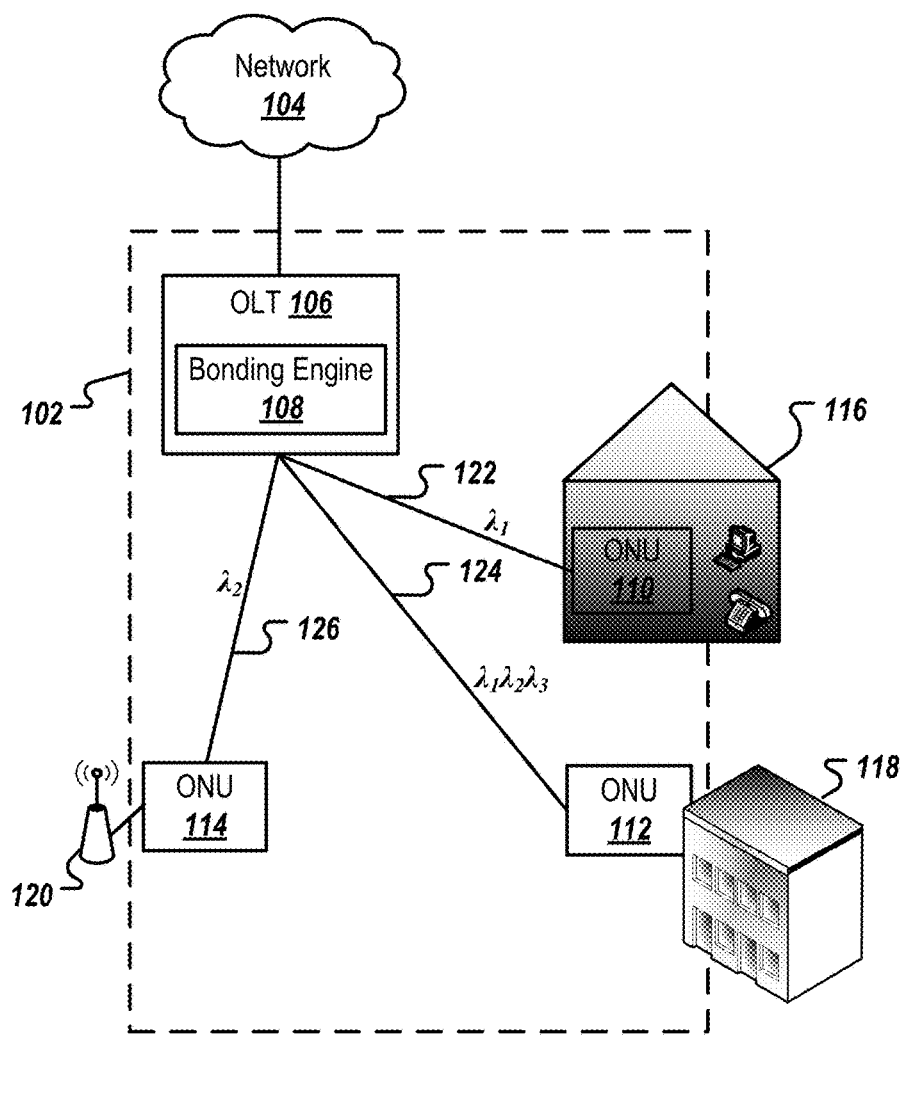
FIG. 1A is a block diagram illustrating an example of a networking environment for Passive Optical Network (PON) wavelength bonding.

This document describes methods, systems, and apparatus for improving bandwidth available to individual packet flow on a Passive Optical Network (PON) by bonding multiple links (e.g., wavelengths). For example, a telecommunications device (e.g., an Optical Line Terminal (OLT)) can determine, in advance of transmitting a bonded packet, when each wavelength in a bonding group will be available for transmitting the bonded packet (e.g., when current transmission of a packet over a given wavelength will be completed). In addition, the telecommunications device can predetermine how many bytes of the bonded packet are to be sent on each bonded wavelength, so that transmissions of various portions of the bonded packet on the bonded wavelengths end at the same time or substantially simultaneously. Although this disclosure refers to passive optical telecommunications systems for purposes of example, the subject matter of this document can be applied to other types of telecommunications systems or other systems that offer multiple wavelengths for data transmission.

A Passive Optical Network (PON), such as a Next-Generation Passive Optical Network 2 (NG-PON2) or a 10 Gbps Ethernet Passive Optical Network (10G-EPON), can provide 10 Gbps data rate per wavelength (not accounting for various overhead). For example, an OLT with multiple optical transceivers (e.g., multiple ports operating at different wavelengths) can transmit an 8.67 Gbps peak data rate to an ONU on one wavelength and receive an 8.67 Gbps peak data rate from the ONU on another wavelength. In some cases, the ONU may have multiple optical transceivers (i.e., a bonding-capable ONU with multiple tunable lasers) so that the ONU can receive data from the OLT on multiple wavelengths downstream and transmit data to the OLT on multiple wavelengths upstream.

As described throughout, "XGEM" refers to a NG-PON2 encapsulation method. For example, XGEM can be a data frame transport scheme that can be used in PON systems that are connection-oriented and that support fragmentation of user data frames into variable sized transmission fragments. The XGEM is used as a wrapper for Ethernet frames to be sent over a PON.

As described throughout, "T-CONT" refers to a transmission container that the OLT uses to grant upstream bandwidth to an ONU. As discussed below, in some instances, multiple XGEMs can be mapped to a single T-CONT.

As described throughout, "bonded XGEM" (bXGEM) and "bonded T-CONT" (bT-CONT) refer to new and/or adjusted forms of XGEM and T-CONT, respectively, that allow for the coexistence of bonded and non-bonded equipment and flows on a matrix of active wavelengths on a PON using the bonding techniques described in detail below. The bXGEM can use the same attributes as an unbonded XGEM and can additionally use bonded attributes for encapsulating bonded transmissions.

The disclosed subject matter addresses problems that arise when required capacity between an OLT and an ONU exceeds maximum capacity of a single wavelength. For example, a packet flow on a PON needs bandwidth that exceeds the bandwidth provided by a single wavelength. In the present disclosure, an OLT can ascertain aggregate capabilities in both downstream and upstream directions (e.g., how many wavelengths each ONU can use in both downstream and upstream directions) of its attached ONUs through standard discovery mechanisms (e.g. physical layer operations, administration and maintenance (PLOAM) or ONU management and control interface (OMCI) in NG-PON2, or multi-point control protocol (MPCP) or Ethernet OAM in 10G-EPON).

For a bonding-capable ONU, the OLT can bond multiple wavelengths to transmit data to the ONU downstream and the ONU can bond multiple wavelengths to transmit data to the OLT upstream. Not all ONUs in a PON are required to participate in wavelength bonding. For example, there can be bonding-capable ONUs and non-bonding ONUs in the same PON. In addition, not all active wavelengths in a PON are required to carry bonded traffic. For example, there can be some wavelengths available to carry bonded traffic while other wavelengths carry only non-bonded traffic. The service and/or traffic flows can be aware of the wavelength bonding (e.g., which ONU is a bonding-capable ONU, which wavelength can carry bonded traffic). Wavelengths bonding can be achieved independently in the upstream and downstream directions, and can span a variable number of wavelengths. Any telecommunications systems with multiple wavelengths may benefit from the subject matter described in this document.

FIG. 1A is a block diagram illustrating an example of a networking environment 100 in which wavelengths in a passive optical network (PON) can be bonded for providing high-rate low-latency services to individual packet flow. As illustrated in FIG. 1A, the environment 100 includes a PON 102 that connects users to a network 104. In some implementations, the environment 100 may include additional and/or different components not shown in the block diagram, such as one or more active optical networks (AONs), another type of network that provides network services (e.g., ADSL2+, VDSL2, etc.), or a combination of these and other technologies. In some implementations, components may also be omitted from the environment 100.

As illustrated, the PON 102 includes an OLT 106 at a service provider's central office (or other distribution point), an ONU 110 near residential locations 116, an ONU 112 near business locations 118, an ONU 114 near wireless communications equipment 120, a fiber optic link 122 connecting the OLT 106 and the ONU 110, a fiber optic link 124 connecting the OLT 106 and the ONU 112, and a fiber optic link 126 connecting the OLT 106 and the ONU 114. The OLT 106 is coupled to a number of ONUs 110, 112, and 114 (also referred to as optical network terminals (ONTs)), which are located near end users, thereby forming a point-to-multipoint network. For example, in the case of Next-Generation Passive Optical Network 2 (NG-PON2), a single OLT port can connect to 64 (or another number of) different ONUs. To serve multiple customers on the same network, the NG-PON2 uses logical multiplexing in a downstream direction and time-division multiplexing in an upstream direction, in addition to wavelength multiplexing in both downstream and upstream directions.

Each ONU can include, or otherwise be coupled to, one or more customer-premises equipment (CPE) or subscriber devices (e.g., CPE modems). For example, the ONU 110 is a device that terminates the PON 102 at the customer end, and provides a service connection to a user living in the residential locations 116. The ONU 110 terminates optical fiber transmission, and can transform incoming optical signals into electrical signals, adapted for processing by subscriber devices. As a result, ONUs can provide network services, for example, to residential locations 116, business locations 118, or other forms of communications infrastructure, such as wireless communications equipment 120.

Each ONU can include one or more optical transceivers (e.g., one or more tunable lasers), each of which are sometimes referred to as Access Note Interface (ANI). For example, the ONU 110 includes one optical transceiver or ANI that can receive data from the OLT (or transmit data to the OLT) on a single wavelength $\lambda_1$. The ONU 112 includes multiple ANIs that can receive data from the OLT (or transmit data to the OLT) on three wavelengths $\lambda_1$, $\lambda_2$, and $\lambda_3$. The ONU 114 includes one ANI that can receive data from the OLT (or transmit data to the OLT) on a single wavelength $\lambda_2$. As a result, the ONU 110 (e.g., a non-bonding ONU) can receive non-bonded data from the OLT (or transmit non-bonded data to the OLT) on a single wavelength $\lambda_1$. The ONU 112 (e.g., a bonding-capable ONU) can receive bonded data from the OLT (or transmit non-bonded data to the OLT) on three wavelengths $\lambda_1$, $\lambda_2$, and $\lambda_3$. The ONU 114 (e.g., a non-bonding ONU) can receive non-bonded data from the OLT (or transmit non-bonded data to the OLT) on a single wavelength $\lambda_2$. The disclosed subject matter does not require all ONUs on a same PON to support multiple wavelengths or bonding.

The OLT 106, as a network distribution element, provides an interface between the PON 102 and the network 104, and serves as the service provider's endpoint of the PON 102. The OLT 106 transmits downstream data traffic to ONUs (e.g., ONUs 110, 112, and 114), and receives upstream data traffic from the ONUs.

As illustrated, the OLT 106 includes a bonding engine 108 through which the OLT controller can detect and identify a bonding-capable ONU on the PON 102. For example, the bonding engine 108 can detect and identify the ONU 112 as a bonding-capable ONU when the ONU 112 registers with the OLT 106. In addition, the bonding engine 108 can ascertain aggregate capabilities in both downstream and upstream directions between the OLT 106 and its attached ONUs through standard discovery mechanisms. For non-bonding ONUs, the OLT 106 will communicate with them according to, for example, an ITU PON standard (e.g., the NG-PON2 standard) or an IEEE PON standard (e.g., the 10G-EPON standard). For a given bonding-capable ONU (e.g., ONU 112), the bonding engine 108 can allocate multiple wavelengths (e.g., $\lambda_1$, $\lambda_2$, and $\lambda_3$) in a bonding group between the ONU and the OLT 106 jointly/simultaneously, for the purpose of bonding data paths between the ONU and the OLT 106 together. Bonding can be achieved independently in the upstream and downstream directions, and can span a variable number of wavelengths between the ONU and the OLT 106.

In a downstream direction, for example, from the OLT 106 to the ONU 112, the bonding engine 108 can determine, in advance, when each wavelength among multiple wavelengths in a bonding group between the OLT 106 to the ONU 112 will be available for transmitting a bonded packet (e.g., by checking transmission schedule on each wavelength). If the multiple wavelengths are idle (e.g., carrying no traffic) when there is a bonded packet to send, the bonding engine 108 can assign various portions of the packet to the multiple wavelengths in the bonding group in a round robin way according to a specified wavelength order known to both the OLT 106 and the ONU 112 (e.g., stored in a memory of the OLT 106 and similarly stored in a memory of the ONU 112). For example, the OLT 106 can inform the ONU 112 of the wavelength order through a management channel, or the order could be established a priori such as according to ascending or descending wavelength. When the ONU 112 receives the various portions of the packet on the multiple wavelengths, the ONU 112 can use a delay equalization technique to align data reception across the synchronous data paths (e.g., ordered wavelengths) and reassemble the packet according to the specified wavelength order.

However, if one or more wavelengths among the multiple wavelengths are busy (e.g., carrying traffic) when there is a bonded packet to send, the bonding engine 108 can determine in advance when each wavelength in the bonding group will be available for transmitting the bonded packet (e.g., by checking a transmission schedule on each wavelength). The bonding engine 108 can predetermine how many bytes of the bonded packet are to be sent on each wavelength, so that transmissions of various portions of the bonded packet on the multiple wavelengths end at the same time or substantially simultaneously. The bonding engine 108 can start sending portions of the bonded packet on one or more idle wavelengths. As the one or more busy wavelengths complete sending its packet, the bonding engine 108 can start sending other portions of the bonded packet on these one or more now-available wavelengths to minimize latency of transmitting the packet. Various portions of the packet can be allocated on the multiple wavelengths in a round robin way according to a specified wavelength order as discussed above. In some cases, when non-bonded traffic is heavy on a particular wavelength, the bonding engine 108 can balance the traffic load by not allocating bonded traffic on the particular wavelength.

In an upstream direction, for example, from the ONU 112 to the OLT 106, the bonding engine 108 can implement Dynamic Bandwidth Allocation (DBA) routines on each wavelength. The DBA routines on each wavelength can process grants to bonding-capable ONUs such that the same Allocation Identifier (Alloc-ID) (or Logical Link layer ID (LLID) for 10G-EPON) is identified in the upstream direction to begin transmission on multiple wavelengths. For example, the bonding engine 108 can send bandwidth maps (BWmaps) for each wavelength to the ONU 112, and the ONU 112 can identify the same Alloc-ID in received BWmaps for multiple wavelengths. Whenever grants for the same Alloc-ID overlap across multiple wavelengths, the ONU 112 can allocate bonded data on the multiple wavelengths similar to the downstream direction, using a single bonded Transmission Container (bT-CONT) per wavelength corresponding to the Alloc-ID. In some implementations, the DBA routines on each wavelength can make the grants occur on different wavelengths at the same time, which in some cases leads to lower latency for traffic flows. In some implementations, the DBA routines on each wavelength can assign varying amounts of time per wavelength in order to optimize the DBA scheduling across offered load, which includes balancing bonded load and non-bonded load leading to higher throughput utilization in some cases. In some implementations, DBA could use multiple grants on multiple wavelengths per XGTC frame to minimize latency.

In both the downstream and upstream directions, bit streams on the bonded wavelengths can be delay-equalized (e.g., via digital signal buffering), so that a given packet can be distributed on, for example, multiple wavelengths $\lambda_1$, $\lambda_2$, and $\lambda_3$ between the OLT 106 and the ONU 112, and end at similar times on the multiple wavelengths $\lambda_1$, $\lambda_2$, and $\lambda_3$. Due to the point-to-multipoint nature of a PON, delay equalization of multiple wavelengths can be performed at the receiver of the ONU 112 in the downstream direction. In the upstream direction, equalization can be performed at both of or either of the transmitter of the ONU 112 and/or the receiver of the OLT 106. In some implementations, both downstream and upstream transmissions can be synchronized with the reference clock of the OLT 106 in conformance with standard protocols (e.g. NG-PON2 and 10G-EPON). Synchronizing with the reference clock of the OLT 106 can allow the ONU 112 to insert delay in a digital parallel and/or serial data path to achieve delay equalization. For example, in a NG-PON2, delay equalization can result in 64-bit alignment between bonded wavelengths (e.g., the quanta defined for 10-Gigabit-capable Passive Optical Network (XG-PON) Encapsulation Method (XGEM) payload and framing sublayer boundaries). In a 10G-EPON, the alignment can be made in 66-bit blocks defined by the reconciliation sublayer. Other PON variations with higher speeds can achieve delay equalization at wider or narrower data width.

In some implementations, the operations performed by the bonding engine 108 can be implemented as operations performed by a data processing apparatus, on data stored on one or more computer-readable storage devices or received from other sources. The term "data processing apparatus" encompasses all kinds of apparatus, devices, and machines for processing data, including, by way of example, a programmable processor, a computer, a system on a chip, or multiple ones, or combinations of the foregoing. The bonding engine 108 can also be implemented as special purpose logic circuitry, for example, a field programmable gate array (FPGA) or an application specific integrated circuit (ASIC).

The network 104 facilitates wireless or wireline communications between the components of the PON 102 with any other local or remote computer, such as additional PONs, servers, or other devices communicably coupled to the network 104, including those not illustrated in FIG. 1A. As illustrated in FIG. 1A, the network 104 is depicted as a single network, but may be comprised of more than one network without departing from the scope of this disclosure.

In some situations, one or more of the illustrated components may be implemented, for example, as one or more cloud-based services or operations. The network 104 may be all or a portion of an enterprise or secured network, or at least a portion of the network 104 may represent a connection to the Internet, a public switched telephone network (PSTN), a data server, a video server, or additional or different networks. In some implementations, a portion of the network 104 may be a virtual private network (VPN). Further, all or a portion of the network 104 can comprise either a wireline or wireless link. Examples of wireless links may include 802.11ac/ad/af/a/b/g/n, 802.20, WiMax, LTE, free-space optical links, and/or any other appropriate wireless link. In other words, the network 104 encompasses any internal or external network, networks, sub-network, or combination thereof, operable to facilitate communications between various computing components, inside and outside the environment 100. The network 104 may communicate, for example, Internet Protocol (IP) packets, Frame Relay frames, Asynchronous Transfer Mode (ATM) cells, voice, video, data, and other suitable information between network addresses. The network 104 may also include one or more local area networks (LANs), radio access networks (RANs), metropolitan area networks (MANs), wide area networks (WANs), all or a portion of the Internet, and/or any other communication system or systems at one or more locations.

Figure 1B:
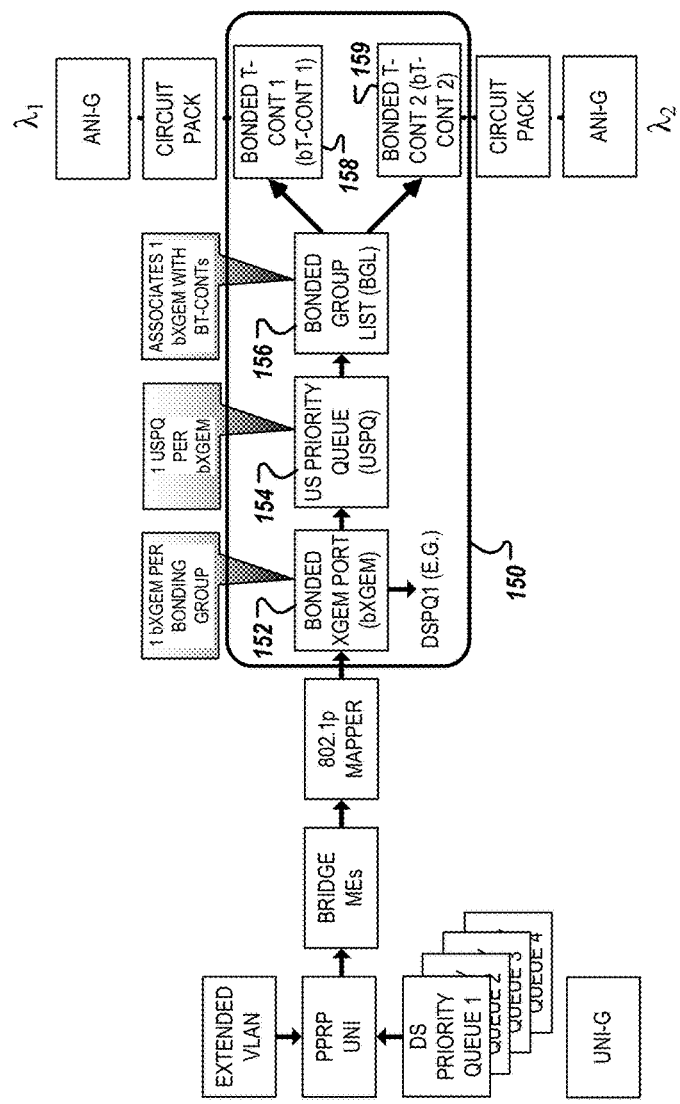
FIG. 1B is a block diagram illustrating an example of a management representation of managed entities (MEs) configured using an ONU management and control interface (OMCI) for PON wavelength bonding.

FIG. 1B is a block diagram illustrating an example of a management representation of managed entities (MEs) configured using an OMCI for PON wavelength bonding. As illustrated in FIG. 1B, MEs can represent a hardware module or behavior that performs a network function in an ONU under control of an OLT. The OMCI can be used to configure and/or manage the MEs based on configuring the OLT and/or the ONUs that are connected on a PON. For example, the OMCI can be used to configure OLT 106 and the ONUs 110, 112, 114 over the PON 102 as illustrated in FIG. 1A.

The OMCI may be configured to use various management protocols to enable management of the OLT (including its MEs) and/or the ONUs via the OLT controller. OMCI is the standard name for the ONT control protocol in ITU-PON standards, but herein the term usage implies any various protocol over which the OLT controller configures the ONU data path. For example, The OMCI may utilize various management protocols such as Ethernet OAM (in the case of IEEE PONs), SNMP, NETCONF/YANG, RESTCONF/YANG, OpenFlow, OFConfig, or other management protocols.

The OMCI can represent any type of suitable software that is implemented and/or executed on a hardware element referred to as an OLT controller. For example, when the OLT controller is the OLT 106, the OMCI can be implemented as a logical component of the OLT 106. Alternatively, when the OLT controller is a separate component from the OLT, the OMCI can be implemented on a component that externally configures the OLT 106 and/or the ONUs that are connected to the OLT over the PON. For example, the OMCI can be implemented on a server that is physically located in a different location from the OLT and the ONUs. In this regard, the OLT controller can include a communications interface to interact with the OLT, and other communications interfaces to interact with the ONUs that are connected to the OLT over the PON.

A user, such as operator or an administrator associated with a service provider of a PON, can use the OMCI to configure and/or manage the operations that are performed by the OLT and/or the ONUs connected to the OLT over the PON. The user may provide input through the OLT controller, which then causes the OLT controller to configure a control plane of the OLT and the multiple ONUs by performing a set of operations relating to the MEs illustrated in FIG. 1B. For example, the OMCI can be used to configure a logical arrangement of MEs as represented in FIG. 1B. User input to configure the OLT controller via command line interface, SNMP, configuration server, orchestration system, configuration database, or the like.

Referring now to the management representation illustrated in FIG. 1B, the MEs that are included within box 150 represent MEs that are added and/or modified to enable the bonding techniques described throughout. For example, addition and/or modification of MEs can be implemented through the OMCI running on the OLT controller.

A bonded XGEM port 152 refers to a port that is assigned in two or more physical ports of the OLT and to an ONU. The bonded XGEM port 152 enables a logical point-to-point connection between the OLT and ONUs over a PON. As discussed below, the bonded XGEM port 152 includes bonded attributes that enable bonded data transmissions in both upstream and downstream directions.

The upstream priority queue (USPQ) 154 refers to a managed entity (from the perspective of the OMCI) that collects traffic of a particular quality of service level and queues the collected traffic for transmission in the upstream or downstream directions. In a baseline configuration (i.e., a configuration that does not enable bonded flows), the USPQ 154 typically points to a scheduler or a T-CONT for transmissions in the upstream direction. In the management representation depicted in FIG. 1B, the USPQ 154 has been adjusted such that it points to a bonded group list (BGL) 156 that is associated with a bXGEM port, enabling the transmission of bonded flows in the upstream direction as described below. The downstream direction for the bXGEM port performs a similar but separate BGL function within the OLT bonding engine 108 to distribute bXGEM data across multiple wavelengths.

The BGL 156 refers to a logical grouping of bT-CONTs 158 and 159 that provide multiple ANI physical paths for traffic data collected by the USPQ 154 to be transmitted upstream across the PON. In the example depicted, each of the bT-CONTs 158 and 159 are assigned to different ANIs corresponding to different wavelength division transceivers, referred to as channel terminations (CT), in the OLT. In this regard, the logical grouping between the BGL 156 and the bT-CONTs 158 and 159 enables traffic collected by the USPQ 154 to be transmitted along multiple bT-CONTs (and consequently, multiple wavelengths that correspond to each bT-CONT). For example, to activate a bT-CONT instance to carry upstream user traffic, the OLT can use the established mapping between a bT-CONT and the USPQ 154 using the BGL 156.

Figure 5:
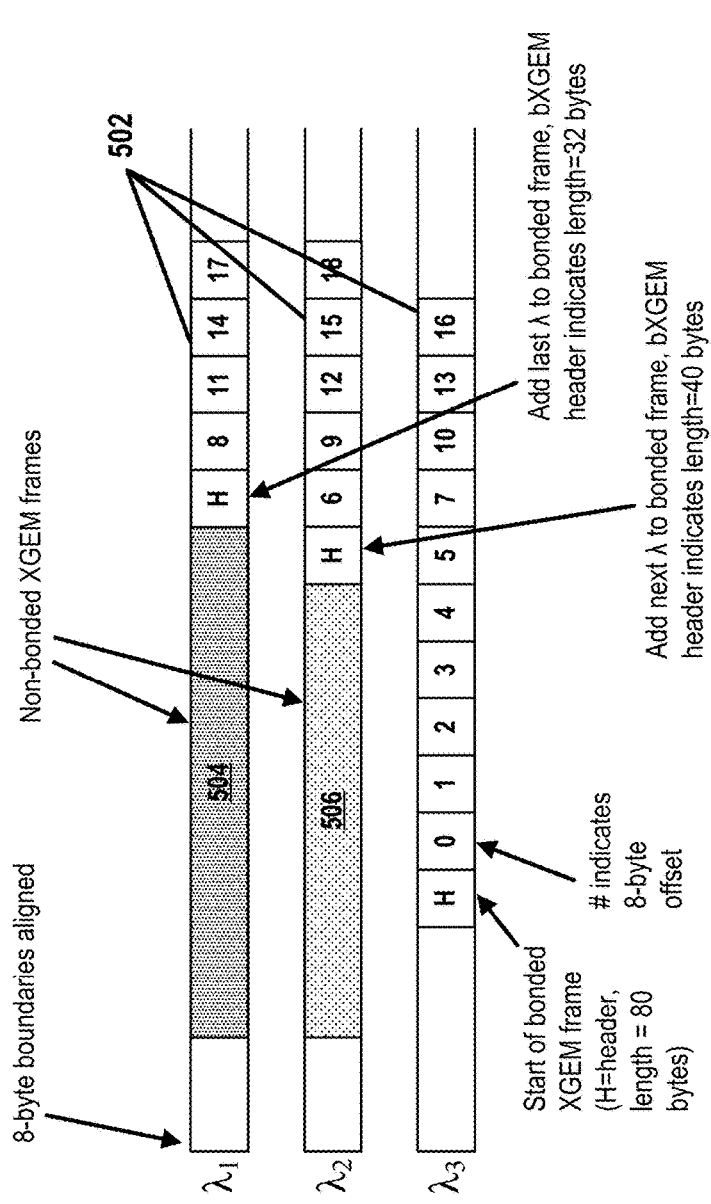
FIG. 5 is a diagram illustrating an example of a wavelength bonding scheme for demultiplexing Service Data Units (SDUs) across multiple wavelengths.

The bT-CONTs 158 and 159 can be ONU objects representing a group of logical connections that appear as a single entity for the purposes of upstream bandwidth assignment on the PON. The bT-CONTs 158 and 159 can have the functionalities of typical unbonded T-CONTs, but with additional functionalities relating to managing data transmission from the USPQ 154. For example, each bT-CONT can be capable of reporting the USPQ 154 fill level status to the OLT to assist in DBA. In addition, when grants to multiple associated bT-CONTs overlap in time, a bonding function, as depicted in FIG. 5, can be used to automatically distribute 8-byte segments among the multiple associated bT-CONTs.

In some implementations, the management representation illustrated in FIG. 1B includes a scheduler entity. In such implementations, the OMCI can be used to create an association between the bT-CONTs 158 and 159 and the scheduler in addition to, or as an alternative of, the associated with the USPQ 154 described above. For example, the scheduler can execute a scheduling function that associates an individual bT-CONT to multiple priority queues. In other examples, the scheduler can replace the functions the USPQ 154 to provide an association between the bXGEM 152 and each of the bT-CONTs 158 and 159.

Modifications and/or additions to MEs within the management representation to enable bonding techniques can be performed without substantially adjusting the protocol stack of a PON. For example, the OMCI can adjust the service adaptation sublayer of the time- and wavelength-division multiplexed transmission convergence (TWDM TC) protocol without adjusting the framing and physical adaptation sublayers. In this regard, configuration and/or management adjustments using the OMCI allows bonded protocol stacks to be used in a similar manner as unbonded protocol stacks.

The example in FIG. 1B includes a single bXGEM 152 for simplicity in illustration. In some implementations, the OMCI enables the configuration of multiple bXGEMs for the OLT and the ONUs connected to the OLT over the PON. In such implementations, each bXGEM is assigned to a different bonding group based on its association to a different BGL. Each BGL associates a corresponding bXGEM to multiple bT-CONTs such as the bT-CONTs 158 and 159. For example, the OMCI can configure a first bXGEM and a second bXGEM for transmitting data over a PON. In this example, a first BGL assigned to the first bXGEM associates the first bXGEM with the bT-CONTs 158 and 159. In addition, a second BGL assigned to the second bXGEM associates with the second bXGEM with the bT-CONTs 158 and 159. In this example, each of the bT-CONTs 158 and 159 are associated with two BGLs (e.g., the first and second BGLs), which enable the association of an individual bT-CONT with multiple bXGEMs using multiple corresponding BGLs.

Figure 2:
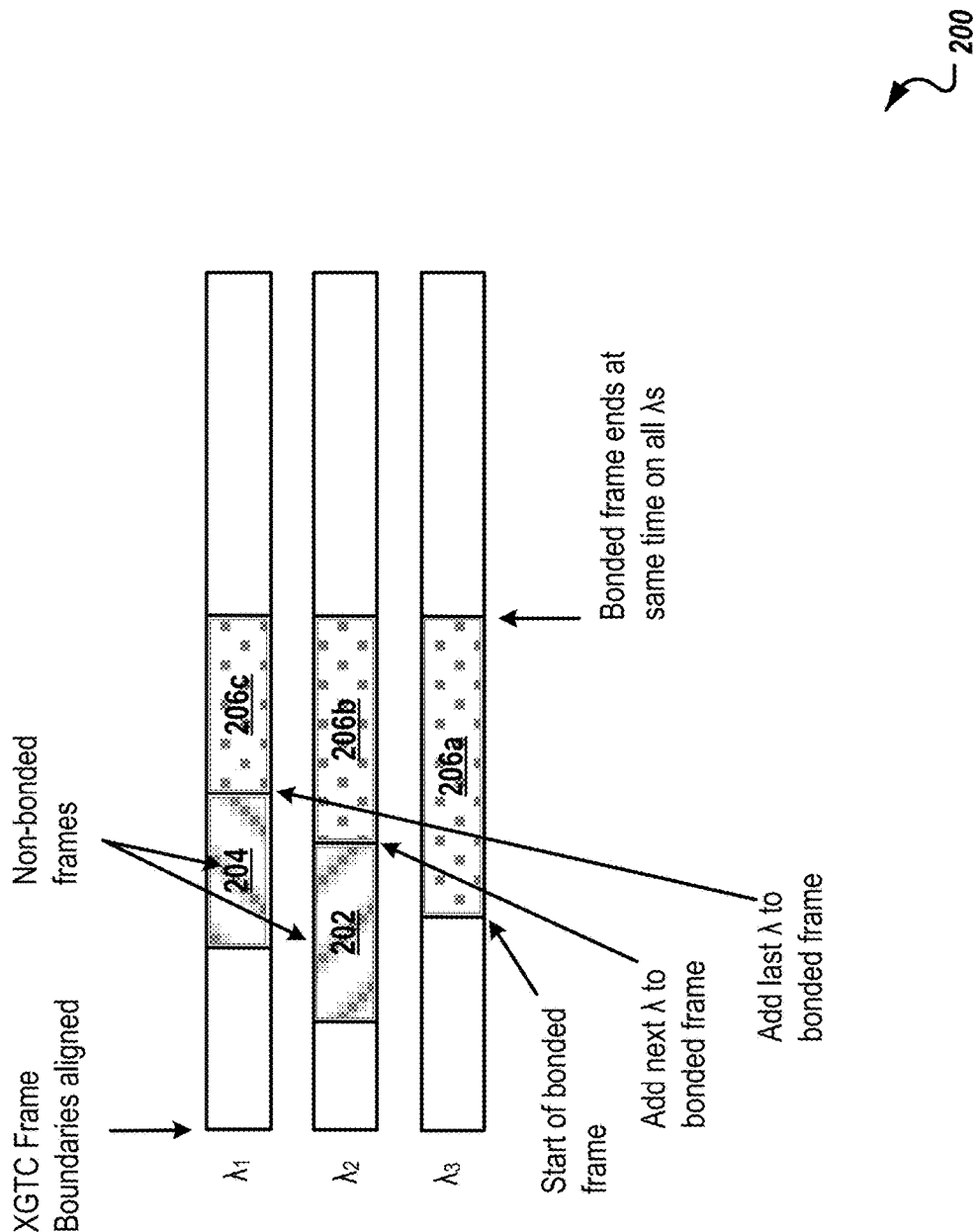
FIG. 2 is a diagram illustrating an example of a wavelength bonding scheme for transmitting a bonded frame.

FIG. 2 is a diagram illustrating an example of a wavelength bonding scheme 200 for transmitting a bonded frame when one or more wavelengths in a bonding group are transmitting non-bonded frames. The scheme 200 shown in FIG. 2, illustrates how OLT 106 allocates multiple wavelengths to transmit a bonded frame to ONU 112 when non-bonded frames are being transmitted on two of the multiple wavelengths similar to those described in FIG. 1A. In some implementations, the scheme 200 may include additional and/or different wavelengths not shown in the diagram. Wavelengths may also be omitted from the scheme 200.

As illustrated, 10-Gigabit-capable Passive Optical Network Transmission Convergence (XGTC) frame boundaries are aligned on three wavelengths $\lambda_1$, $\lambda_2$, and $\lambda_3$ at the OLT 106. For purposes of example, assume that all three wavelengths are idle at the beginning. Then, a non-bonded frame 202 is received by the OLT 106 to be transmitted to the ONU 114. The OLT 106 allocates the non-bonded frame 202 on wavelength $\lambda_2$ and transmits the non-bonded frame 202 to ONU 114 on the wavelength $\lambda_2$, since the ONU 114 can only receive data from the OLT 106 on the wavelength $\lambda_2$ as described in FIG. 1A. While the non-bonded frame 202 is being transmitted on wavelength $\lambda_2$, another non-bonded frame 204 is received by the OLT 106 to be transmitted to the ONU 110. The OLT 106 allocates the non-bonded frame 204 on wavelength $\lambda_1$ and transmits the non-bonded frame 204 to ONU 110 on the wavelength $\lambda_1$, since the ONU 110 can only receive data from the OLT 106 on the wavelength $\lambda_1$ as described in FIG. 1A.

Pre-emption is generally not supported in either the ITU-T PONs (e.g., NG-PON2) or the IEEE PONs (e.g., 10G-EPON). When a bonded frame 206 (i.e., 206a-c) is received by the OLT 106 to be transmitted to the ONU 112 on wavelengths $\lambda_1$, $\lambda_2$, and $\lambda_3$ in a bonding group, only wavelength $\lambda_3$ is idle while wavelengths $\lambda_1$ and $\lambda_2$ are busy transmitting the non-bonded frames 204 and 202, respectively. Instead of waiting for all three wavelengths to be idle and then transmitting the bonded frame 206 on all three wavelengths, the bonding engine 108 of the OLT 106 can allocate the bonded frame 206 on all three wavelengths in advance (e.g., before transmissions of non-bonded frames on wavelengths $\lambda_1$ and $\lambda_2$ have completed) and start transmitting allocated portions of the bonded frame 206a on currently available wavelength $\lambda_3$. The bonded frame 206 is being transmitted at a data rate of a single wavelength (e.g., 8.67 Gbps). When wavelength $\lambda_2$ completes transmitting the non-bonded frame 202, allocated portions of the bonded frame 206b can be transmitted on the wavelength $\lambda_2$. As a result, the bonded frame 206 is being transmitted at a data rate of two wavelengths (e.g., 17.34 Gbps). When wavelength $\lambda_1$ completes transmitting the non-bonded frame 204, allocated portions of the bonded frame 206c can be transmitted on the wavelength $\lambda_1$. As a result, the bonded frame 206 is being transmitted at a data rate of three wavelengths (e.g., 26 Gbps).

The bonding engine 108 pre-allocates the bonded frame 206 on all three wavelengths in a way that transmissions of various portions of the bonded frame 206 end at the same time or substantially simultaneously (e.g., within 6.4 nanoseconds when a bonded frame comprises multiple 64-bit words and 10 Gbps data rate is provided on each wavelength). For example, the bonding engine 108 needs to determine in advance when each wavelength in the bonding group will be available for transmitting the bonded frame (e.g., when current transmission of a non-bonded frame over a given wavelength will be completed). Then, the bonding engine 108 can predetermine how many bytes of the bonded frame are to be sent on each bonded wavelength, so that transmissions of various portions of the bonded frame on the bonded wavelengths end at the same time as shown in FIG. 2. In some cases, transmissions of various portions of the bonded frame on the bonded wavelengths may not end at the same time, rather end substantially simultaneously (as shown and discussed in FIG. 4 below). In doing so, the bonding mechanism used by the bonding engine 108 for downstream direction does not require fragmentation headers (other than one instance of the normal XGEM frame header for each wavelength that carries a packet), sequence numbers, or reassembly buffers to implement wavelength bonding in a PON. Instead, the delay equalization technique (discussed in FIGS. 3A-3B below) is used to align data reception across the synchronous data paths.

Figures 3A, 3B:
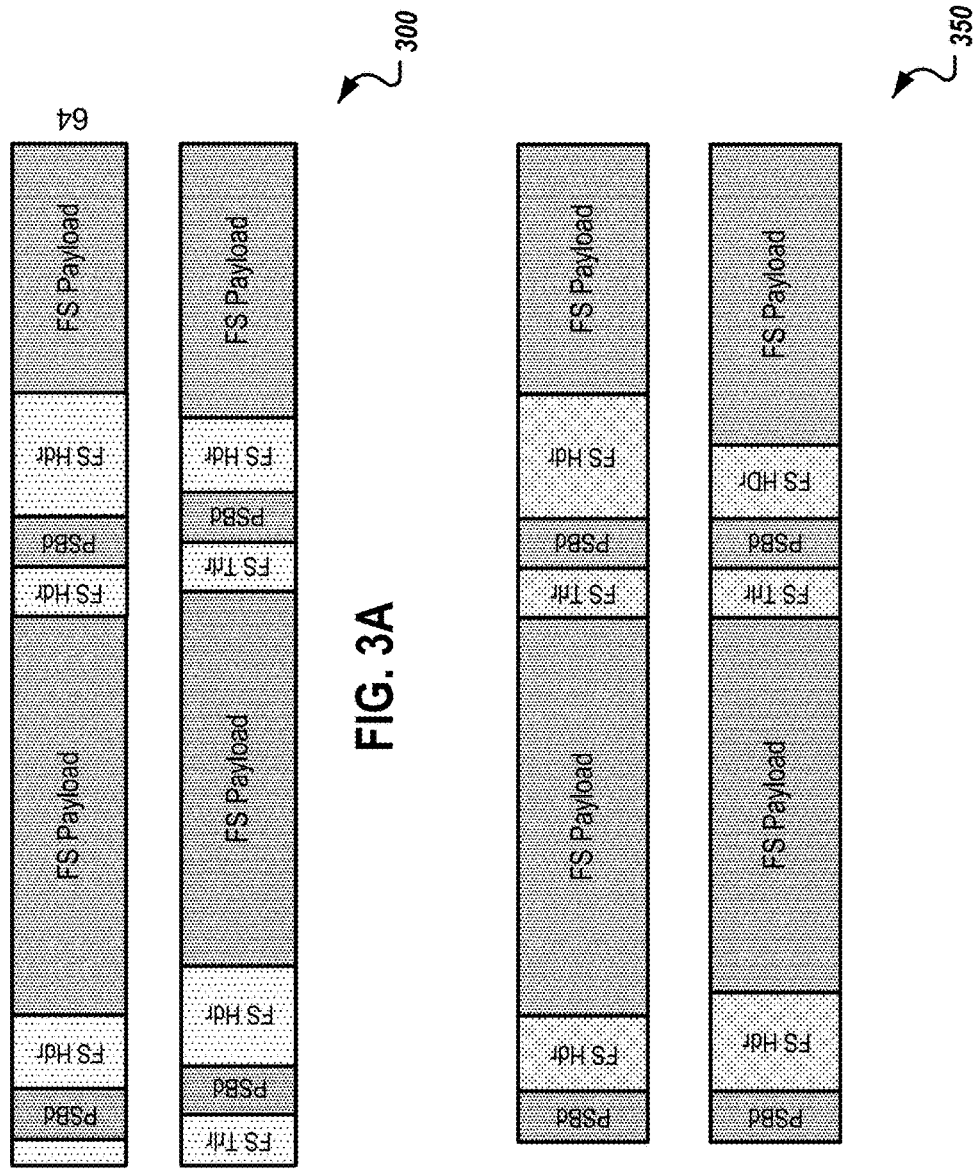
FIG. 3A is a diagram illustrating examples of frames received prior to delay equalization.
FIG. 3B is a diagram illustrating examples of frames received after delay equalization.

FIGS. 3A-3B are diagrams illustrating examples of received frames 300 prior to delay equalization and examples of received frames 350 after delay equalization. For purposes of example, the frames 300 and 350 shown in FIGS. 3A-3B are NG-PON2 frames. In some implementations, the frames 300 and 350 may include additional and/or different wavelengths not shown in the diagram. Wavelengths may also be omitted from the frames 300 and 350.

FIG. 3A illustrates parallel data received, for example, at an ONU on two wavelengths (e.g., $\lambda_1$ and $\lambda_2$) as a 64-bit aligned parallel data stream. Since data are received on two wavelengths, there is differential delay (or relative delay) between the two wavelengths. For example, on wavelength 1 (e.g., $\lambda_1$) the first Physical Synchronization Block downstream (PSBd) is received earlier than the first PSBd on wavelength 2 (e.g., $\lambda_2$) due to the differential delay.

FIG. 3B illustrates the received frames at the ONU on two wavelengths (e.g., $\lambda_1$ and $\lambda_2$) after delay equalization. For example, the NG-PON2 ONU can detect the differential delay between the two wavelengths from an OLT through measurement of the PSBd frame overhead and use that information to delay-equalize received frames (e.g., via digital signal buffering) on the two wavelengths. Alignment of PSBd overhead between wavelengths may be accomplished with concurrent PSBd headers, or with a known non-zero offset between PSBd overhead on different wavelength (as specified or dictated by means of control). Similarly an ONU using EPON may use alignment markers such as those specified for 40GBASE-R or 100GBASE-R, or multipoint MAC control (MPCP) timestamps to assist in delay equalization. Other methods of detecting delay alignment are also possible. After delay equalization, alignment of underlying data is assured across wavelengths to 8-byte boundaries (other alignment quanta such as 4 bytes or 16 bytes are also possible). Since the Framing Sublayer (FS) header (FS Hdr) may contain variable length BWmap and PLOAMd, FS Hdr on the two wavelengths may finish at different times. As a result, FS Payload on the two wavelengths may start at different times. In some implementations, instead of performing the delay equalization at an OLT receiver, an ONU transmitter can insert some offset based on the known differential delay into the transmitted frames so that the frames can be aligned when received at the receiver.

Figure 4:
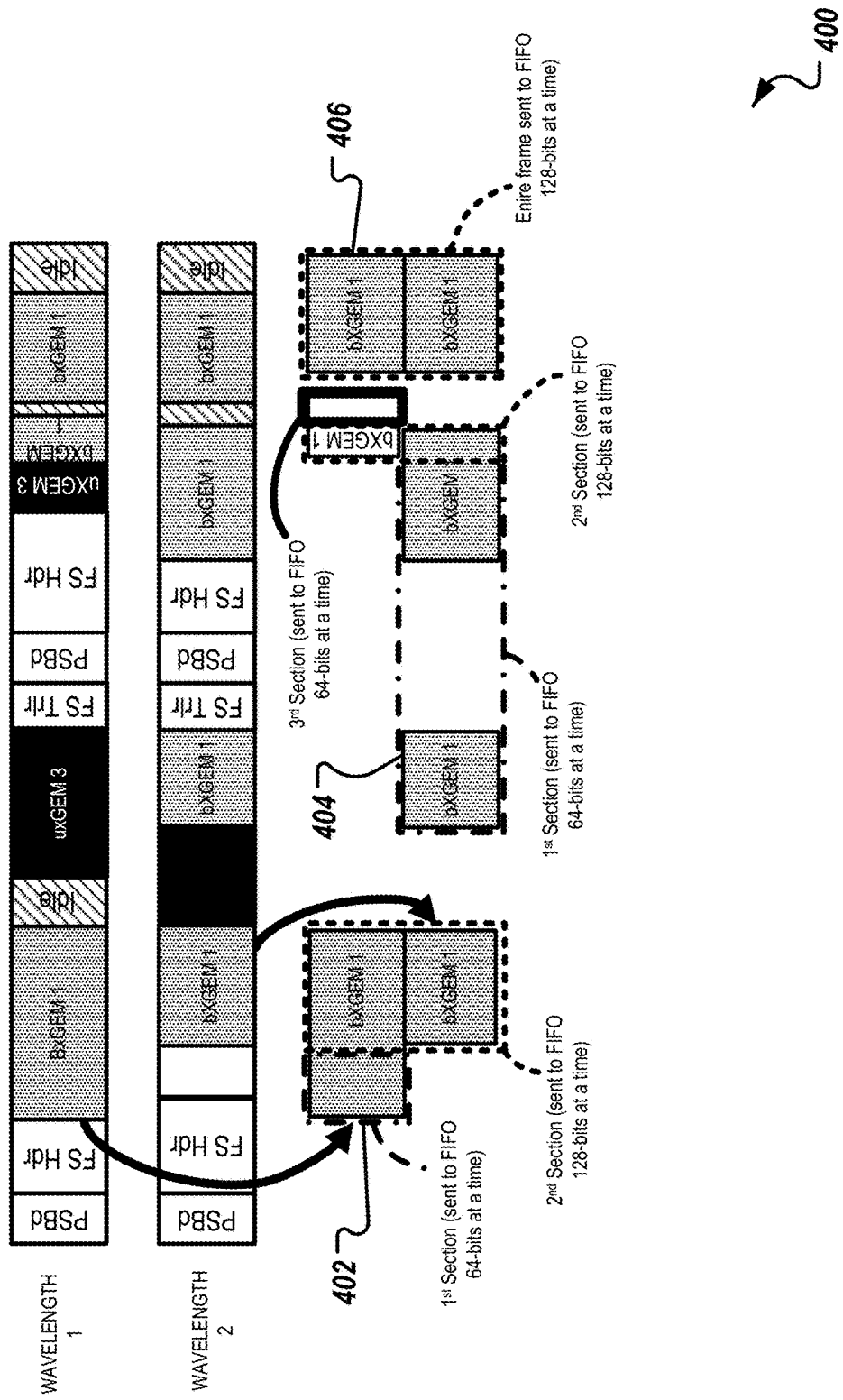
FIG. 4 is a diagram illustrating an example of a Framing Sublayer (FS) payload carrying bonded frames and non-bonded frames.

FIG. 4 is a diagram illustrating an example of a Framing Sublayer (FS) payload 400 carrying bonded frames and non-bonded frames (e.g., allocated by the bonding engine 108). For purposes of example, the frames in FIG. 4 are NG-PON2 frames. In some implementations, the payload 400 may be carried by additional and/or different wavelengths not shown in the diagram. Wavelengths may also be omitted from the payload 400.

As illustrated, FS payload sections on both wavelengths (e.g., $\lambda_1$ and $\lambda_2$) are filled with both bonded XGEM (bXGEM) frames and non-bonded XGEM (uXGEM) frames. For example, three bonded XGEM frames 402, 404, and 406 (e.g., denoted by bXGEM 1) are transmitted (not to scale) on wavelengths in a bonding group (e.g., wavelength 1 and 2). At the beginning, the first section of the bonded XGEM frame 402 is carried exclusively by wavelength 1 since wavelength 2 carries a non-bonded frame (e.g., an uXGEM 2 frame). A 64-bit word at a time of the first section of the bonded XGEM frame 402 is passed to a packet FIFO mechanism (e.g., at a data rate of roughly 8.67 Gbps accounting for Forward Error Correction (FEC)). After wavelength 2 completes transmission of the non-bonded frame, wavelength 2 joins wavelength 1 to carry second section of the bonded XGEM frame 402. As a result, a 128-bit word at a time of the second section of the bonded XGEM frame 402 is passed to the packet FIFO mechanism (e.g., at a data rate of roughly 17.34 Gbps accounting for FEC). For example, in a timeslot wavelength 1 carries the first 64-bit of a given 128-bit word to be transmitted and wavelength 2 carries the subsequent 64-bit of the given 128-bit word, followed in the next timeslot by wavelength 1's 64-bit data and then wavelength 2's 64-bit data, and so on (e.g., transmitting alternately between wavelengths 1 and 2). Both the transmitter and the receiver need to know this wavelength order of wavelength 1 first and wavelength 2 next. As illustrated in FIG. 4, the bonded XGEM frame 402 finishes with 128-bit alignment on wavelengths 1 and 2. Word sizes other than 64-bits may also be considered, for example, 32-bit words or 128-bit words, though 64-bit words are illustrated for NG-PON2 since it is the base transmission quanta for XGEM payload.

For the bonded XGEM frame 404, first section of the bonded XGEM frame 404 is carried exclusively by wavelength 2 since wavelength 1 carries a non-bonded frame (e.g., an uXGEM 3 frame). A 64-bit word at a time of the first section of the bonded XGEM frame 404 is passed to the packet FIFO mechanism (e.g., at a data rate of roughly 8.67 Gbps accounting for FEC). After wavelength 1 completes transmission of the non-bonded frame, wavelength 1 joins wavelength 2 to carry second section of the bonded XGEM frame 404. As a result, a 128-bit word at a time of the second section of the bonded XGEM frame 404 is passed to the packet FIFO mechanism (e.g., at a data rate of roughly 17.34 Gbps accounting for FEC). As illustrated in FIG. 4, the bonded XGEM frame 404 finishes without 128-bit alignment on wavelengths 1 and 2, since the third section of the bonded XGEM frame 404 only has 64 bits and can be carried exclusively by wavelength 1. As a result, while wavelength 1 is transmitting the third section of the bonded XGEM frame 404, wavelength 2 is idle and can be used to carry a different frame, bonded or unbonded.

For the bonded XGEM frame 406, the entire frame begins on both wavelengths 1 and 2, and is carried 128-bits at a time for the duration of the frame (e.g., at a data rate of roughly 17.34 Gbps accounting for FEC). For example, in a timeslot wavelength 1 carries the first 64-bit of a given 128-bit word to be transmitted and wavelength 2 carries the subsequent 64-bit of the given 128-bit word, followed in the next timeslot by wavelength 1's 64-bit data and then wavelength 2's 64-bit data, and so on (e.g., transmitting alternately between wavelengths 1 and 2). As illustrated in FIG. 4, the bonded XGEM frame 406 finishes with 128-bit alignment on wavelengths 1 and 2.

FIG. 5 is a diagram illustrating an example of a wavelength bonding scheme 500 for demultiplexing Service Data Units (SDUs, e.g. XGEM-encapsulated Ethernet frames) across multiple wavelengths. The scheme 500 shown in FIG. 5 illustrates how, for example, the bonding engine 108 of the OLT 106 allocates multiple wavelengths to transmit a bonded frame to ONU 112 when non-bonded frames are being transmitted on two of the multiple wavelengths similar to those described in FIGS. 1A and 2. In some implementations, the scheme 500 may include additional and/or different wavelengths not shown in the diagram. Wavelengths may also be omitted from the scheme 500.

For purposes of example, the frames in FIG. 5 are NG-PON2 frames and the bonded XGEM frame 502 comprising 150 bytes of data is divided into nineteen 64-bit (i.e., 8-byte) data segments (e.g., segment number 0 to segment number 18). In some implementations, the bonded XGEM frame 502 can be divided into 4-bytes data segments or any other length data segments. As illustrated, XGTC frame boundaries are aligned on three wavelengths $\lambda_1$, $\lambda_2$, and $\lambda_3$ at the OLT 106. At the beginning, all three wavelengths are idle. Then, a non-bonded XGEM frame 504 is received by the OLT 106 to be transmitted to the ONU 110. The OLT 106 allocates the non-bonded XGEM frame 504 on wavelength $\lambda_1$ and transmits the non-bonded XGEM frame 504 to ONU 110 on the wavelength $\lambda_1$, since the ONU 110 can only receive data from the OLT 106 on the wavelength $\lambda_1$ as described in FIG. 1A. While the non-bonded XGEM frame 504 is being transmitted on wavelength $\lambda_1$, another non-bonded XGEM frame 506 is received by the OLT 106 to be transmitted to the ONU 114. The OLT 106 allocates the non-bonded XGEM frame 506 on wavelength $\lambda_2$ and transmits the non-bonded XGEM frame 506 to ONU 114 on the wavelength $\lambda_2$, since the ONU 114 can only receive data from the OLT 106 on the wavelength $\lambda_2$ as described in FIG. 1A.

When the bonded XGEM frame 502 is received by the OLT 106 to be transmitted to the ONU 112 on wavelengths $\lambda_1$, $\lambda_2$, and $\lambda_3$ in a bonding group, only wavelength $\lambda_3$ is idle while wavelengths $\lambda_1$ and $\lambda_2$ are busy transmitting the non-bonded XGEM frames 504 and 506, respectively. Instead of waiting for all three wavelengths to be idle and then transmitting the bonded XGEM frame 502 on all three wavelengths, the bonding engine 108 of the OLT 106 can allocate the bonded XGEM frame 502 on all three wavelengths according to a specified wavelength order known to both the OLT 106 and the ONU 112 in advance (e.g., before transmissions of non-bonded XGEM frames on wavelengths $\lambda_1$ and $\lambda_2$ have completed) and start transmitting allocated portions of the bonded XGEM frame 502 on currently available wavelength $\lambda_3$.

For example, before transmitting the bonded XGEM frame 502, the bonding engine 108 of the OLT 106 can determine when current transmission of non-bonded XGEM frames 504 and 506 over wavelengths $\lambda_1$ and $\lambda_2$ will be completed (e.g., by checking transmission schedule on each wavelength). Based on the determination, the bonding engine 108 can calculate how many 8-byte segments of the bonded XGEM frame 502 to be sent on each bonded wavelength, so that transmissions of various portions of the bonded XGEM frame 502 on the bonded wavelengths end at the same time or substantially simultaneously.

As illustrated, the bonding engine 108 allocates segment number 0-7, 10, 13, and 16 on wavelengths $\lambda_3$, segment number 6, 9, 12, 15, and 18 on wavelengths $\lambda_2$, and segment number 8, 11, 14, and 17 on wavelengths $\lambda_1$. In the example of a 150-byte XGEM frame, all segments numbered 0-17 contain a full 8 bytes, and the final segment number 18 would contain only 6 bytes. In this example, the amount of additional overhead data required to send this frame over the bXGEM instead of a single wavelength is the two bXGEM headers (8 bytes each) for activating different wavelengths. In some cases, the transmitter may choose to send bXGEM frames over all wavelengths (to minimize latency), and in other cases the transmitter may limit the number of wavelengths over which to send a bXGEM frame (to minimize overhead, hence maximizing throughput). In some implementations, the allocation is sent to a transmission scheduler.

As illustrated for the example of carrying a 150-byte Ethernet payload, a bXGEM header is inserted each time a bonded XGEM frame is started on wavelengths that are known to be in-service and operational at the OLT 106 and ONU 112 for the intended SDU. The bXGEM header includes an XGEM id and payload length following the bXGEM header. For example, when the bonded XGEM frame 502 starts on $\lambda_3$, a bXGEM header, indicating bonded XGEM frame 502 and a data length of, for example, 80 bytes for ten 8-byte segments, is inserted before segment number 0. Similarly, when the bonded XGEM frame 502 starts on $\lambda_2$, a bXGEM header, indicating bonded XGEM frame 502 and a payload length of, for example, 38 bytes for five 8-byte segments, is inserted before segment number 6.

When the bonded XGEM frame 502 starts on $\lambda_1$, a bXGEM header, indicating bonded XGEM frame 502 and a payload length of, for example, 30 bytes for four 8-byte segments, is inserted before segment number 8. As a result, when a non-bonding ONU receives the bXGEM header, it knows that the bonded XGEM frame is not for it and will, for example, discard the data received for a period of time calculated based on the data length in the bXGEM header. For the bonded receiver (e.g., the ONU 112), when receiving a bXGEM header and payload on, for example, a second and subsequent wavelength (i.e., $\lambda_2$), the bonded receiver knows the sequence of transmission across wavelengths $\lambda_2$ and $\lambda_3$ (e.g., the specified wavelength order known to the bonded receiver) and can reassemble the bonded XGEM frame 502.

Figure 6:
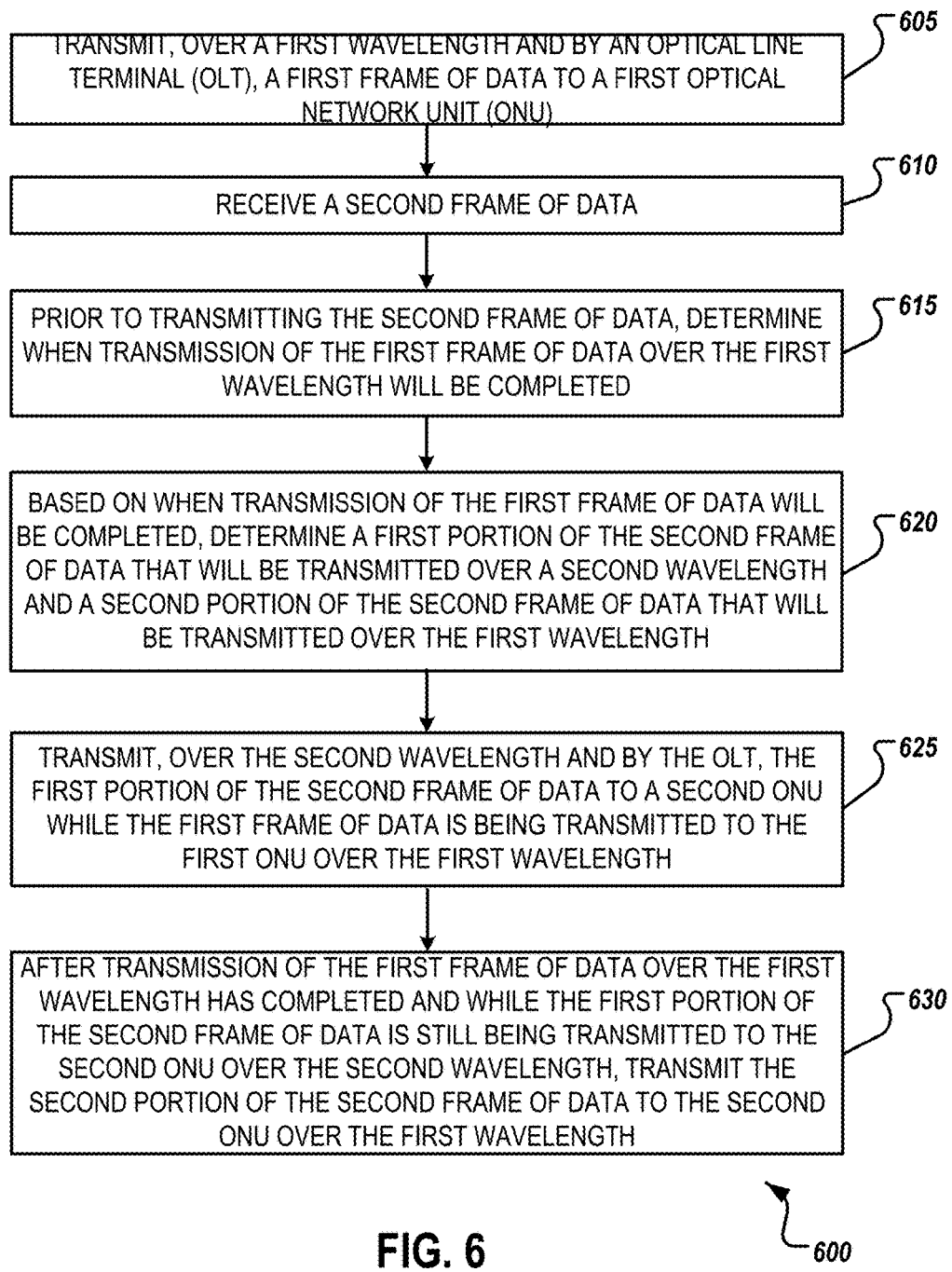
FIG. 6 is a flow chart of an example of a process for PON wavelength bonding.

FIG. 6 is a flow chart of an example of a process 600 for PON wavelength bonding. The process 600 can be performed, for example, by one or more telecommunications devices, such as those described with reference to FIG. 1A (e.g., OLT 106). The process 600 can also be implemented as instructions stored on a non-transitory, computer-readable medium that, when executed by one or more telecommunications devices, configures the one or more telecommunications devices to perform and/or causes the one or more telecommunications devices to perform the actions of the process 600.

A first frame of data to a first optical network unit (ONU) is transmitted by an optical line terminal (OLT) over a first wavelength (605). In some implementations, the first frame of data is a non-bonded frame of data and the first ONU is a non-bonding ONU. In some implementations, there may be more processing flows that are directed by the constraints of the first frame of data as shown and discussed in FIG. 7 below.

A second frame of data is received by the OLT to be transmitted to a second ONU different than the first ONU (610). The second frame of data is a bonded frame of data and the second ONU is a bonding-capable ONU. The second frame of data is stored in a buffer for bonded data while the first frame of data is stored in a different buffer for non-bonded data. In some implementations, there is a single buffer for both bonded and non-bonded data. In some implementations, there is a buffer for each wavelength.

Prior to transmitting the second frame of data, a determination is made when transmission of the first frame of data over the first wavelength will be completed (615). In some implementations, the determination is made by checking the transmission schedule on the first wavelength.

Based on when transmission of the first frame of data will be completed, a first portion of the second frame of data that will be transmitted over a second wavelength and a second portion of the second frame of data that will be transmitted over the first wavelength are determined (620). In some implementations, the second frame of data is divided into 8-byte segments and the first portion includes multiple 8-byte segments of the second frame of data. In some implementations, the first portion of the second frame of data and the second portion of the second frame of data are both transmitted to the second ONU without a sequence number. In such a situation, both the OLT and the second ONU agree on how various portions of the second frame of data are assigned to various different wavelengths. In some implementations, an 8-byte XGEM header is added to both the first portion of the second frame of data and the second portion of the second frame of data.

While the first frame of data is being transmitted to the first ONU over the first wavelength, a first portion of a second frame of data to a second ONU is transmitted by the OLT over a second wavelength (625). After transmission of the first frame of data over the first wavelength has completed and while the first portion of the second frame of data is still being transmitted to the second ONU over the second wavelength, a second portion of the second frame of data to the second ONU is transmitted by the OLT over the first wavelength (630). In some implementations, transmissions of the first portion and the second portion of the second frame of data end at the same time.

In some implementations, a specified wavelength order is identified. The specified wavelength order specifies an order in which portions of a single data frame are to be transmitted over available wavelengths. The specified wavelength order is known to both the OLT and a given ONU. In some implementations, the specified wavelength order is defined by wavelength numbers in ascending order (e.g., $\lambda_1$ first, then $\lambda_2$, and $\lambda_3$). The specified wavelength order can be defined, for example, by wavelength numbers in descending order or any other order that both the OLT and the given ONU agreed upon. In some implementations, wavelength numbers are channel numbers assigned to wavelengths. When the specified wavelength order is identified, the first portion of the second frame of data is transmitted over a given wavelength that is highest in the wavelength order and is available to transmit data while the first frame of data is being transmitted over the first wavelength.

Transmitting the second portion of the second frame of data over the first wavelength can include the following operations. A determination that the first wavelength is next highest in the wavelength order after the second wavelength is made. The second portion of the second frame of data is then transmitted over the first wavelength based on the determination that the first wavelength is the next highest in the wavelength order. In some implementations, identifying the specified wavelength order includes identifying an NG-PON2 channel numbering corresponding to wavelengths being used to transmit data. In some implementations, the specified wavelength order may be determined and controlled by a software process at the OLT, and communicated through a management channel to the bonding-capable ONUs prior to establishing bonded communications.

In some implementations, when the specified wavelength order is identified, a determination is made, based on the wavelength order, that the second wavelength is last in the wavelength order and that the first wavelength is first in the wavelength order. In response to determining that the second wavelength is last in the wavelength order and that the first wavelength is first in the wavelength order, the second portion of the second frame of data is transmitted over the first wavelength based on the determination that the first wavelength is the first in the wavelength order.

In some implementations, a third frame of data is transmitted to the second ONU over the first and second wavelengths based on a specified wavelength order. The first and second wavelengths carry no traffic right before transmitting the third frame of data (e.g., both wavelengths are available). Various portions of the third frame of data are assigned round robin to the first and second wavelengths. For each of the first and second wavelengths, an 8-byte XGEM header is added with payload length for the third frame of data. In some implementations, a 4-byte header is added with payload length for the third frame of data for each of the first and second wavelengths.

In some implementations, the OLT implements a dynamic allocation algorithm. The dynamic allocation algorithm uses wavelength as a parameter in its bandwidth allocation for bonded entities (e.g., bonding-capable ONUs). In some implementations, the dynamic allocation algorithm allocates time grants for different wavelengths of a bonded Transmission Container (T-CONT) based on which wavelengths will be available and how much data is being transmitted when in a bonded mode of operation.

In some implementations, the OLT includes a bonding engine, which includes one or more processes that perform operations in the process 600. The one or more processes can be implemented in a dedicated hardware state machine, computer processor, and/or FPGA. In some implementations, the OLT and the first and second ONUs are on a Next-Generation Passive Optical Network 2 (NG-PON2). In some implementations, the OLT may separate its subsidiary components (e.g. bonding engine, transmission scheduler, DBA BWmap generator, optical transceivers) onto different processors, circuits, or hardware in a distributed manner.

The process 600 shown in FIG. 6 can be modified or reconfigured to include additional, fewer, or different actions (not shown in FIG. 6), which can be performed in the order shown or in a different order. For example, before 625, various portions of the second frame of data are assigned to various different wavelengths based on a specified ordering of the wavelengths by the OLT. In some implementations, one or more of the actions shown in FIG. 6 can be repeated or iterated, for example, until a terminating condition is reached. In some implementations, one or more of the individual actions shown in FIG. 6 can be executed as multiple separate actions, or one or more subsets of the actions shown in FIG. 6 can be combined and executed as a single action. In some implementations, one or more of the individual actions shown in FIG. 6 may also be omitted from the process 600.

Figure 7:
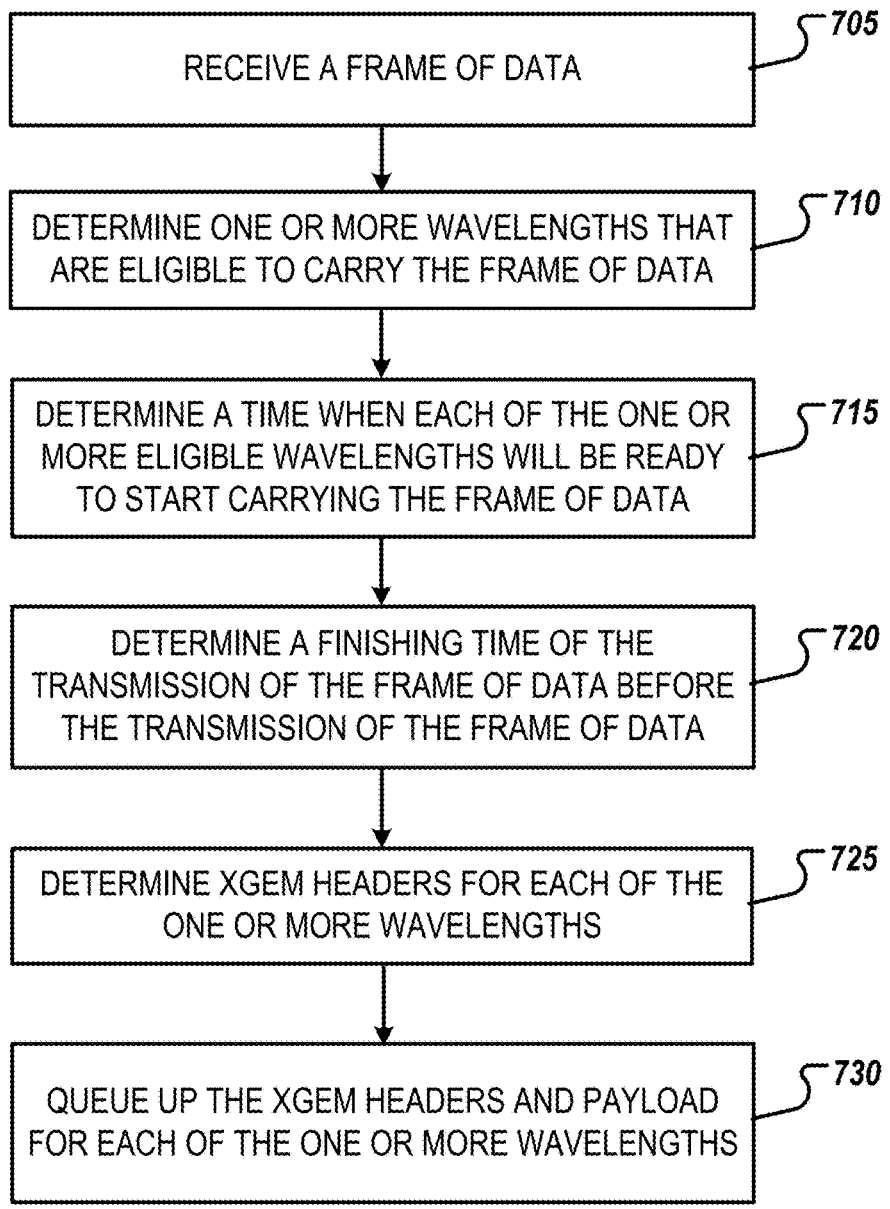
FIG. 7 is a flow chart of an example of a scheduling process for PON wavelength bonding of the downstream transmission.

FIG. 7 is a flow chart of an example of a scheduling process 700 for PON wavelength bonding of the OLT downstream (point-to-multipoint) transmission. The scheduling process 700 can be performed, for example, by one or more telecommunications devices, such as those described with reference to FIG. 1A (e.g., OLT 106). The scheduling process 700 can also be implemented as instructions stored on a non-transitory, computer-readable medium that, when executed by one or more telecommunications devices, configures the one or more telecommunications devices to perform and/or causes the one or more telecommunications devices to perform the actions of the scheduling process 700.

A frame of data is received (705). In some implementations, the frame of data is received by an OLT to be transmitted to an ONU. One or more wavelengths that are eligible to carry the frame of data are determined (710). A time when each of the one or more eligible wavelengths will be ready to start carrying the frame of data is determined (715). In some implementations, the determination (e.g., 710, 715) is made by checking the transmission schedule on each of the one or more wavelengths. A finishing time of the transmission of the frame of data is determined before the transmission of the frame of data (720). In some implementations, the finishing time can be determined based on a preferred distribution of the frame of data across the one or more wavelengths. The preferred distribution distributes the frame of data across the one or more wavelengths so that transmissions of various portions of the frame of data on the one or more wavelengths end at the same time or substantially simultaneously (e.g., within a specified or threshold amount of time of each other). XGEM headers for each of the one or more wavelengths are determined (725). The XGEM headers and payload (e.g., various portions of the frame of data) for each of the one or more wavelengths are queued up for transmission (730).

The scheduling process 700 shown in FIG. 7 can be modified or reconfigured to include additional, fewer, or different actions (not shown in FIG. 7), which can be performed in the order shown or in a different order. For example, before 730, other frames of data destined only for "busy" wavelengths are prevented from requesting the next allocation. In some implementations, one or more of the actions shown in FIG. 7 can be repeated or iterated, for example, until a terminating condition is reached. For example, after 730 the scheduling process 700 may return to 705 to receive another frame of data. In some implementations, one or more of the individual actions shown in FIG. 7 can be executed as multiple separate actions, or one or more subsets of the actions shown in FIG. 7 can be combined and executed as a single action. In some implementations, one or more of the individual actions shown in FIG. 7 may also be omitted from the scheduling process 700.

Figure 8:
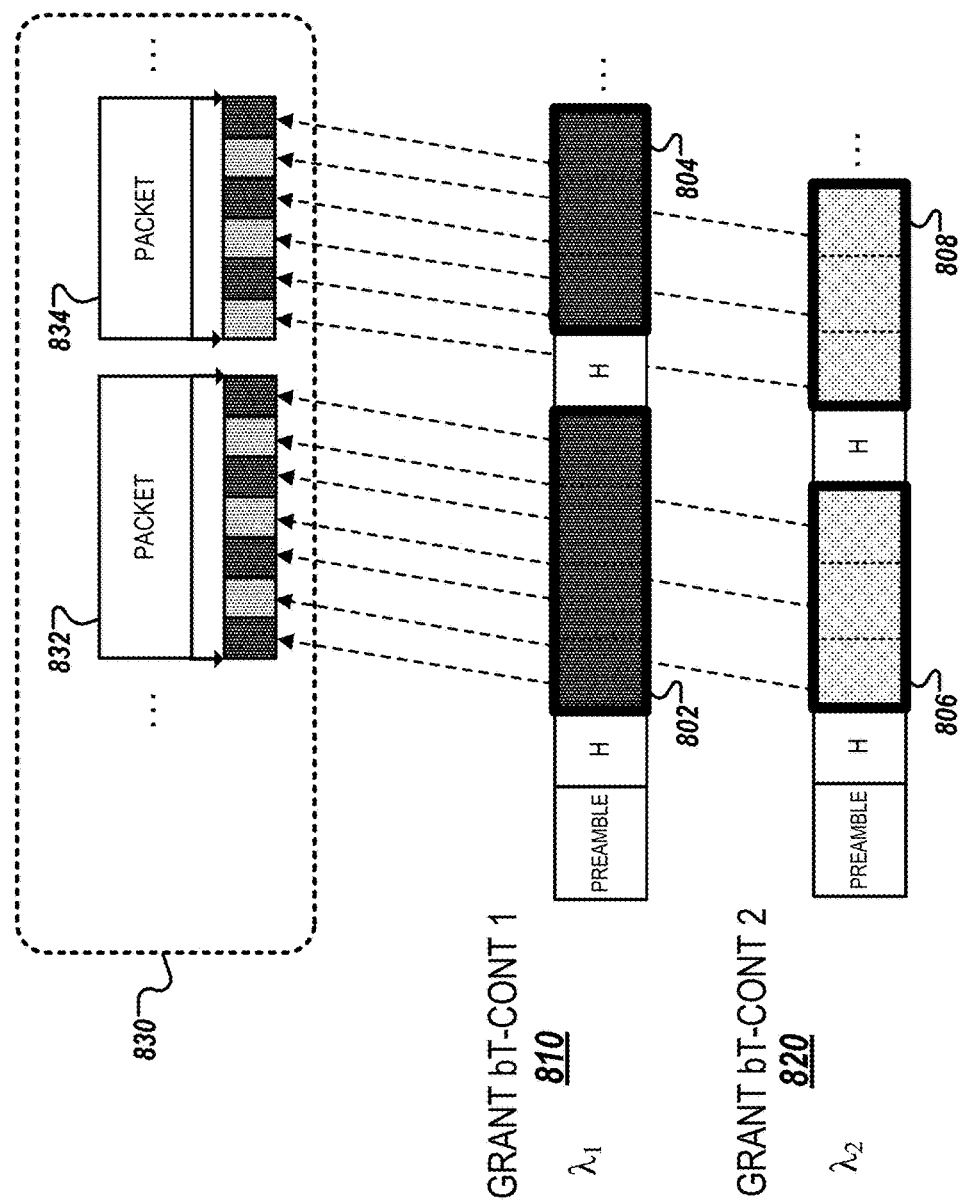
FIG. 8 is a diagram illustrating an example of wavelength bonding.

FIG. 8 is a diagram illustrating an example of wavelength bonding. The illustrated wavelength bonding technique can be performed in both the upstream and downstream directions. For simplicity of illustration, however, an example of upstream wavelength bonding is illustrated. In the example illustrated in FIG. 8, a bonding service adaptation sub-layer 830 of a protocol stack of a PON is configured and/or adjusted based on the management functions defined through the OMCI, as depicted and described in reference to FIG. 1B. For example, the OMCI can be used to define bonded XGEM ports (e.g., the bXGEM 152) in the OLT, which is then associated with multiple bonded transmission containers (e.g., bT-CONTs 158 and 159) using a bonded group list (e.g., the BGL 156). This association enables the use of multiple wavelengths (e.g., a first wavelength and a second wavelength $\lambda_2$) to transmit data over the bXGEM between the OLT and ONUs connected over a PON.

The multiplexing technique illustrated in FIG. 8 is performed at the OLT. The OLT can perform the multiplexing operation prior to transmitting bonded flows to ONUs in the downstream direction. The bT-CONTs 810 and 820, which are used by the OLT to grant bandwidth to the ONUs over the PON, are associated with a different wavelength. For example, the grant bT-CONT 810 is associated with a first wavelength $\lambda_1$ and the grant bT-CONT 820 is associated with a second wavelength $\lambda_2$. The first and the second wavelength are associated with a single bXGEM using the BGL.

During a multiplexing operation, data packets 802, 804, 806, and 808 that are destined for bonding channels are divided into segments (e.g., 8-byte segments) and distributed among the first and second wavelengths. For example, segments included in the packets 802 and 806 are distributed to a bonded packet 832, and segments included in the packets 804 and 808 are distributed to a data packet 834. In this example, the first and the second wavelengths are associated with the same bXGEM, which forms a bonding group that corresponds to the bXGEM. Using the illustrated wavelength bonding technique, the OLT is able to grant bandwidth to multiple bT-CONTs 810 and 820 simultaneously, which allows an increased bandwidth operation over dynamic bandwidth allocation. For example, if 10 Gbps bandwidth is simultaneously granted to each of the bT-CONTs 810 and 820, then the transmission of bonded packets 832 and 834 enable a 20 Gbps operation.

The wavelength bonding technique illustrated in FIG. 8 can similarly be performed in the downstream direction to increase the bandwidth to and from an ONU. For example, data to be transmitted over multiple wavelengths (e.g., the first and second wavelengths) can be placed in the same bXGEM to enable increased bandwidth to and from the ONU.

Figure 9:
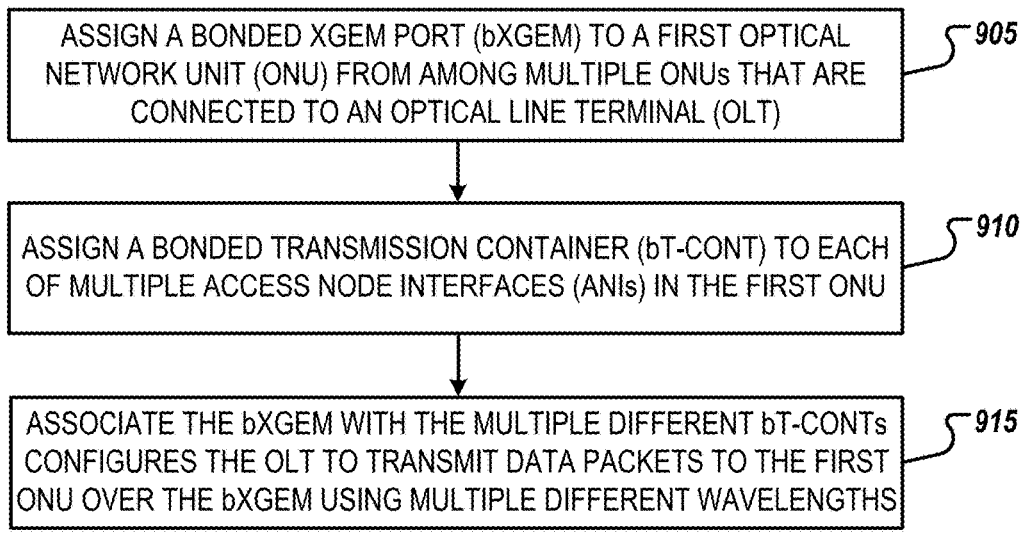
FIG. 9 is a flow chart of an example of an OLT configuration process that enables PON wavelength bonding.

FIG. 9 is a flow chart of an example of an OLT configuration process 900 that enables PON wavelength bonding. The configuration process 900 can be performed, for example, by an OLT controller such as that described with respect to FIG. 1B. In some implementations, the OLT controller is a located on one or more telecommunications devices, such as those described with reference to FIG. 1A (e.g., OLT 106 and the ONUs 112, 114, 116). Alternatively, the OLT can be a separate electronic device that remotely configures a control plane of the one or more telecommunications devices. The configuration process 900 can also be implemented as instructions stored on a non-transitory, computer-readable medium that, when executed by one or more devices, configures the one or more telecommunications devices to perform and/or causes the one or more telecommunications devices to perform the actions of the example scheduling process 700.

A bXGEM is assigned to a first ONU from among multiple ONUs that are connected to the OLT (905). The bXGEM is assigned in two or more ports of the OLT such that the bXGEM port can be used bonded flow of multiple wavelengths. A bT-CONT is assigned to each of multiple ANIs of the first ONU (910). As described above, each bT-CONT is configured to transmit data over a particular wavelength. The bXGEM is associated with multiple different bT-CONTs that each allocate time grants to the first ONU using a BGL (915). The association configures the OLT to transmit data packets to the first ONU over the bXGEM using multiple different wavelengths. For example, as depicted in FIG. 8, packet data to be transmitted between the OLT and the first ONU are divided into, for example, 8-byte segments. The segments are then distributed across multiple wavelengths of a bXGEM using multiple bT-CONTs corresponding to each wavelength and commonly associated with the bXGEM through the BGL. In addition, the association of the bXGEM and the multiple different bT-CONTs also enables the first ONU to transmit data packets to the OLT over the bXGEM using multiple different wavelengths corresponding to the multiple different bT-CONTs. In the downstream direction, simultaneously placing data in the same bXGEM on multiple wavelengths enables a bandwidth that exceeds 10 Gbps to and from an ONU. In the upstream direction, granting bandwidth to multiple bT-CONTs by the OLT enables allocation of greater than 10 Gpbs operation over DBA.

In some implementations, the multiple different bT-CONTs include a first bT-CONT (e.g., the bT-CONT 810) that allocates time grants to an ONU for a first wavelength (e.g., $\lambda_1$), and a second bT-CONT (e.g., the bT-CONT 820) that allocates time grants to an ONU for a second wavelength (e.g., $\lambda_2$). In such implementations, a priority queue associated with the bXGEM (e.g., USPQ 154) is used to associate the first bT-CONT and the second bT-CONT containing traffic for the bXGEM. Alternatively, a scheduler can be used to associate the first bT-CONT and the second bT-CONT containing traffic for the bXGEM as discussed in reference to FIG. 1B.

In some implementations, the method 900 further includes the following operations. An unbonded XGEM port (XGEM) for transmitting packet data to an ONU that is connected to the OLT is assigned in two or more physical ports of the OLT. The XGEM is associated with an unbonded T-CONT that grants time grants to the ONU for either the first wavelength or the second wavelength. The association of the XGEM with the T-CONT configures the OLT to transmit additional data packets to the ONU over the XGEM using either the first wavelength or the second wavelength.

In some implementations, the method 900 further includes the following operations. An offered load representing a combined traffic volume on each of the first bT-CONT and the second bT-CONT is determined. A traffic load over the first and second bT-CONTs are dynamically balanced based on the determined combined load.

In the implementations above, the data packets transmitted to the first ONU include a first set of segments to be transmitted on the first wavelength (e.g., segments included in packets 802 and 804), and a second set of segments to be transmitted on the second wavelength (e.g., segments included in packets 806 and 808). The first set of segments and the second set of segments can each include 8-byte segments of packet data.

While this specification contains many specific implementation details, these should not be construed as limitations on the scope of any inventions or of what may be claimed, but rather as descriptions of features specific to particular implementations of particular inventions. Certain features that are described in this specification, in the context of separate implementations, can also be implemented in combination or in a single embodiment. Conversely, various features that are described in the context of a single embodiment can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A optical line terminal (OLT) controller comprising:
   a first communications interface over which the OLT controller interacts with an OLT;
   a second communications interface that enables the OLT controller to interact with multiple optical network units (ONUs); and
   one or more processors that configure a control plane of the OLT and the multiple ONUs by performing operations comprising:

assigning, in two or more physical ports of the OLT, a bonded XGEM (bXGEM) to a first optical network unit (ONU) from among multiple ONUs that are connected to the OLT;

assigning, to each of multiple access node interfaces (ANIs) in the first ONU, a bonded Transmission Container (bT-CONT);

associating, using a bonded group list (BGL), the bXGEM that is assigned to the first ONU with multiple different bT-CONTs of the first ONU; and wherein the BGL association of the bXGEM with the multiple different bT-CONTs configures the first ONU to transmit data packets to the OLT over the bXGEM using multiple different wavelengths corresponding to the multiple different bT-CONTs.

2. The OLT controller of claim 1, wherein:

the multiple different bT-CONTs comprise a first bT-CONT that carries traffic from the first ONU over a first wavelength and a second bT-CONT that carries traffic from the first ONU over a second wavelength, and the operations performed by the one or more processors include associating, using a priority queue associated with the bXGEM, the first bT-CONT and the second bT-CONT containing traffic for the bXGEM.

3. The OLT controller of claim 2, wherein the operations performed by the one or more processors include:

associating, using a scheduler associated with the bXGEM, the first bT-CONT and the second bT-CONT containing traffic for the bXGEM.

4. The OLT controller of claim 2, wherein the operations performed by the one or more processors include:

assigning, in one of the two or more physical ports of the OLT, an unbonded XGEM port (XGEM) for transmitting packet data to a second ONU from the among the multiple ONUs that are connected to the OLT;

associating the XGEM with an unbonded Transmission Container (T-CONT) of the second ONU; and wherein the association of the XGEM with the T-CONT configures the second ONU to transmit additional data packets to the OLT over the XGEM using the single wavelength.

5. The OLT controller of claim 2, wherein the operations performed by the one or more processors include:

assigning, in one of the two or more physical ports of the OLT, an unbonded XGEM port (XGEM) for transmitting packet data to the first ONU from the among the multiple ONUs that are connected to the OLT;

associating the XGEM with an unbonded Transmission Container (T-CONT) of the first ONU; and wherein the association of the XGEM with the T-CONT configures the first ONU to transmit additional data packets to the OLT over the XGEM using the single wavelength.

6. The OLT controller of claim 2, wherein the operations performed by the one or more processors include:

determining an offered load representing a combined traffic volume on the upstream priority queue associated with the first bT-CONT and the second bT-CONT; and dynamically balancing a traffic load over the first and second bT-CONTs based on the determined combined load and other traffic on the PON.

7. The OLT controller of claim 2, wherein the OLT controller runs on a server system that is distinct from the OLT.

8. The OLT controller of claim 1, wherein the OLT controller runs on the OLT.

9. A method performed by an optical line terminal (OLT) controller, the method comprising:

assigning, in two or more physical ports of the OLT, a bonded XGEM (bXGEM) to a first optical network unit (ONU) from among multiple ONUs that are connected to an OLT;

assigning, to each of multiple access node interfaces (ANIs) in the first ONU, a bonded Transmission Container (bT-CONT);

associating, using a bonded group list (BGL), the bXGEM that is assigned to the first ONU with multiple different bT-CONTs of the first ONU; and wherein the BGL association of the bXGEM with the multiple different bT-CONTs configures the first ONU to transmit data packets to the OLT over the bXGEM using multiple different wavelengths corresponding to the multiple different bT-CONTs.

10. The method of claim 9, wherein:

the multiple different bT-CONTs comprise a first bT-CONT that carries traffic from the first ONU over a first wavelength and a second bT-CONT that carries traffic from the first ONU over a second wavelength, and the operations performed by the one or more processors include associating, using a priority queue associated with the bXGEM, the first bT-CONT and the second bT-CONT containing traffic for the bXGEM.

11. The method of claim 10, further comprising:

associating, using a scheduler associated with the bXGEM, the first bT-CONT and the second bT-CONT containing traffic for the bXGEM.

12. The method of claim 10, further comprising:

assigning, in one of the two or more physical ports of the OLT, an unbonded XGEM port (XGEM) for transmitting packet data to a second ONU from the among the multiple ONUs that are connected to the OLT;

associating the XGEM with an unbonded Transmission Container (T-CONT) of the second ONU; and wherein the association of the XGEM with the T-CONT configures the second ONU to transmit additional data packets to the OLT over the XGEM using the single wavelength.

13. The method of claim 10, further comprising:

assigning, in one of the two or more physical ports of the OLT, an unbonded XGEM port (XGEM) for transmitting packet data to the first ONU from the among the multiple ONUs that are connected to the OLT;

associating the XGEM with an unbonded Transmission Container (T-CONT) of the first ONU; and wherein the association of the XGEM with the T-CONT configures the first ONU to transmit additional data packets to the OLT over the XGEM using the single wavelength.

14. The method of claim 10, further comprising:

determining an offered load representing a combined traffic volume on the upstream priority queue associated with the first bT-CONT and the second bT-CONT; and dynamically balancing a traffic load over the first and second bT-CONTs based on the determined combined load and other traffic on the PON.

15. The method of claim 10, wherein the OLT controller runs on a server system that is distinct from the OLT.

16. The method of claim 9, wherein the OLT controller runs on the OLT.

17. A non-transitory computer-readable storage device storing computer program instructions that, when executed by an optical line terminal (OLT) controller, cause the OLT controller to perform operations comprising:

assigning, in two or more physical ports of the OLT, a bonded XGEM (bXGEM) to a first optical network unit (ONU) from among multiple ONUs that are connected to the OLT;

assigning, to each of multiple access node interfaces (ANIs) in the first ONU, a bonded Transmission Container (bT-CONT);

associating, using a bonded group list (BGL), the bXGEM that is assigned to the first ONU with multiple different bT-CONTs of the first ONU; and wherein the BGL association of the bXGEM with the multiple different bT-CONTs configures the first ONU to transmit data packets to the OLT over the bXGEM using multiple different wavelengths corresponding to the multiple different bT-CONTs.

18. The device of claim 17, wherein:

the multiple different bT-CONTs comprise a first bT-CONT that carries traffic from the first ONU over a first wavelength and a second bT-CONT that carries traffic from the first ONU over a second wavelength, and the operations performed by the one or more processors include associating, using a priority queue associated with the bXGEM, the first bT-CONT and the second bT-CONT containing traffic for the bXGEM.

19. The device of claim 18, wherein the operations performed by the OLT controller include:

associating, using a scheduler associated with the bXGEM, the first bT-CONT and the second bT-CONT containing traffic for the bXGEM.

20. The device of claim 18, wherein the operations performed by the OLT controller include:

assigning, in one of the two or more physical ports of the OLT, an unbonded XGEM port (XGEM) for transmitting packet data to a second ONU from the among the multiple ONUs that are connected to the OLT;

associating the XGEM with an unbonded Transmission Container (T-CONT) of the second ONU; and wherein the association of the XGEM with the T-CONT configures the second ONU to transmit additional data packets to the OLT over the XGEM using the single wavelength.

* * * * *